US012160701B2

(12) United States Patent
Lee

(10) Patent No.: US 12,160,701 B2
(45) Date of Patent: Dec. 3, 2024

(54) DUAL STRUCTURE TPE EARTIP HAVING WAX GUARD

(71) Applicant: AZLA Inc., Seoul (KR)

(72) Inventor: Sang Won Lee, Seoul (KR)

(73) Assignee: AZLA Inc., Seoul (KR)

( * ) Notice: Subject to any disclaimer, the term of this patent is extended or adjusted under 35 U.S.C. 154(b) by 0 days.

(21) Appl. No.: 18/501,570

(22) Filed: Nov. 3, 2023

(65) Prior Publication Data

US 2024/0179450 A1 May 30, 2024

(30) Foreign Application Priority Data

Nov. 29, 2022 (KR) ........................ 10-2022-0162953

(51) Int. Cl.
*H04R 1/12* (2006.01)
*H04R 1/10* (2006.01)

(52) U.S. Cl.
CPC ............. *H04R 1/12* (2013.01); *H04R 1/1016* (2013.01)

(58) Field of Classification Search
CPC .... H04R 25/654; H04R 25/60; H04R 1/1016; H04R 25/652; H04R 2225/0213; H04R 25/656; H04R 2225/0216; H04R 2460/11; H04R 25/604; H04R 25/602; H04R 2225/025; H04R 1/1058; H04R 9/06; H04R 11/02; H04R 1/1066; H04R 1/1033; H04R 1/2807; H04R 1/34; H04R 1/1091;

(Continued)

(56) References Cited

U.S. PATENT DOCUMENTS

2009/0052711 A1* 2/2009 Murozaki ............ H04R 1/1091 381/328
2009/0103760 A1* 4/2009 Stiehl .................. B29C 45/0025 381/371

(Continued)

FOREIGN PATENT DOCUMENTS

JP 2009-55249 A 3/2009
KR 10-2384246 B1 4/2022

OTHER PUBLICATIONS

Korean Request for the Submission of an Opinion for KR 10-2022-0162953 dated Mar. 3, 2023.

(Continued)

*Primary Examiner* — Carolyn R Edwards
*Assistant Examiner* — Julie X Dang
(74) *Attorney, Agent, or Firm* — Sughrue Mion, PLLC

(57) ABSTRACT

A dual structure thermoplastic elastomer (TPE) eartip having a wax guard, which is an eartip mounted on one side of an earphone and inserted into an external auditory meatus of a wearer to stably fix the position of the earphone including a core portion formed in a hollow cylindrical structure corresponding to an outer circumferential surface of one end of the earphone and configured with a TPE material having a first hardness value; a wax guard portion formed in a plate-type structure integrally formed with an upper end of the core portion and having a plurality of through-holes formed therein and configured with the same material having the same hardness value as the core portion; and a flange portion formed in a structure continuously forming a curved structure sideward and downward in a radial shape after extending a predetermined height upward from the upper end of the core portion.

5 Claims, 11 Drawing Sheets

(58) Field of Classification Search
CPC ........ H04R 1/10; H04R 1/345; H04R 29/001; H04R 2499/11; H04R 1/1008; H04R 1/26; H04R 1/2811; H04R 25/658; B33Y 80/00; A61F 11/08; A61F 2240/004; A61F 2240/001; A61F 11/085; A61F 2210/0071
USPC ................................ 381/328, 380, 370, 381
See application file for complete search history.

(56) References Cited

U.S. PATENT DOCUMENTS

| | | | | |
|---|---|---|---|---|
| 2010/0177918 | A1* | 7/2010 | Keady | B33Y 80/00<br>606/162 |
| 2011/0051981 | A1* | 3/2011 | Lehdorfer | H04R 1/1075<br>381/380 |
| 2012/0082336 | A1* | 4/2012 | Wubker | H04R 25/654<br>264/267 |
| 2014/0238774 | A1* | 8/2014 | Blendinger | H04R 1/1016<br>181/135 |
| 2015/0030196 | A1* | 1/2015 | Basseas | H04L 61/2514<br>381/380 |
| 2021/0235210 | A1* | 7/2021 | Kröni | H04R 25/604 |
| 2021/0315740 | A1* | 10/2021 | Lonsky | B33Y 80/00 |

OTHER PUBLICATIONS

Korean Written Decision on Registration for KR 10-2022-0162953 dated Jun. 30, 2023.

* cited by examiner

< RELATED ART >

DUAL STRUCTURE TPE EARTIP HAVING WAX GUARD

CROSS-REFERENCE TO RELATED APPLICATION

This application claims priority to and the benefit of Korean Patent Application No. 10-2022-0162953, filed on Nov. 29, 2022, the disclosure of which is incorporated herein by reference in its entirety.

BACKGROUND

1. Field of the Invention

The present disclosure relates to a dual structure thermoplastic elastomer (TPE) eartip, and more particularly, to a dual structure TPE eartip having a stable mounting structure due to a hardness of a core portion and a hardness of a flange portion configured to be different from each other, a structure that can ensure hygiene, and a structure that can implement a comfortable fit.

2. Discussion of Related Art

Nowadays, many smartphone users use typical hands-free earphones or Bluetooth earphones when listening to music or talking on the phone using smartphones.

Generally, when a smartphone is purchased first, bundled earphones are provided in most cases. Although the sound quality of earphones may be slightly inferior compared to headphones, since earphones are easy to carry due to their small sizes, earphones are now a daily necessity due to the general spread of smartphones.

When classified according to form, earphones may be mainly classified into open-type earphones and kernel-type earphones. The open-type earphones were used more in the case of early models, but nowadays, the open-type earphones and kernel-type earphones are being used in similar proportions.

Advantages of the open-type earphones are that, since a speaker module in a housing of the earphone does not completely seal an earhole and sound is not directly transferred thereto, some of the sound leaks to the outside, and a user may feel a comfortable sense of openness. Advantages of the kernel-type earphones are that there is an effect of blocking noise, and regardless of the shape of an outer ear, the earphone easily comes in close contact with an earhole and a fixing strength is high when an eartip that fits a width of an inner ear is mounted.

The open-type earphones and kernel-type earphones are complementary in some aspects. Earphones made in an attempt to address disadvantages of the open-type earphones, including a low fixing strength, degradation in the ability to reproduce low-pitched sound due to sound leakage, and introduction of external noise, are the kernel-type earphones, and conversely, opposite to the open-type earphones, the kernel-type earphones have disadvantages that, despite having a high fixing strength and having a noise blocking function and an ability to reproduce low-pitched sound, the earphone comes in close contact with an earhole, and air circulation is hindered, which may cause a user to feel a foreign body sensation, stuffiness, or pain.

Also, the kernel-type earphones have advantages that, due to allowing maximum close contact between the speaker and the ear and minimizing external noise like closed-type headphones, there is little interference from ambient noise, and sound generated from a vibration plate does not leak to the outside, which makes it possible to listen to music or the like in places with harsh external environments, that is, places where external noise is severe, and prevents causing inconvenience to the surroundings. However, the kernel-type earphones have disadvantages that, when used for a long period of time, they are relatively uncomfortable to wear, compared to the open-type earphones, due to pressure of the eartip in close contact with the ear, and since the sound from the vibration plate directly affects an eardrum, the eardrum may be damaged due to impact caused by pressure of air.

In order to address the above problems, there has been developed an eartip in which, as illustrated in FIG. 1, a core portion (11) having a structure coupled to one end of an earphone and a flange portion (12) coming in contact with an inner surface of an external auditory meatus of a wearer are configured with a flexible material.

The eartip having the above structure is manufactured by an injection-molding method using a single mold due to technical limitations and various reasons. That is, the manufacturing method is a method in which the core portion (11) coupled to the earphone and the flange portion (12) coming in contact with the inner surface of the external auditory meatus of the wearer are ejected using a single mold and is a method in which the core portion (11) and the flange portion (12) are manufactured to have the same hardness.

Since the flange portion (12) and the core portion (11) have the same hardness, when the core portion (11) is frequently attached to and detached from the one end of the earphone, due to its low material hardness, space may be formed between the core portion (11) and the one end of the earphone, or a coupling strength of the core portion (11) to the one end of the earphone may gradually decrease in some cases.

Therefore, there is a need for technology that can address the above-mentioned problems of the related art.

RELATED ART DOCUMENT

Patent Document (Patent Document 0001) Korean Patent Registration No. 10-1323805 (Date of Registration: Oct. 24, 2013)

SUMMARY OF THE INVENTION

The present disclosure is directed to providing an eartip having a structure that can change a partial pressure applied to a skin surface of an external auditory meatus of a wearer due to the eartip while the eartip is worn in the wearer's ear into a distributed pressure to address discomfort caused by the pressure and a foreign body sensation, can prevent foreign matter formed in the wearer's ear from entering the eartip to ensure hygiene, and can ensure a stable coupling state with an earphone.

One aspect of the present disclosure provides a dual structure thermoplastic elastomer (TPE) eartip, which is an eartip mounted on one side of an earphone and inserted into an external auditory meatus of a wearer to stably fix the position of the earphone, the dual structure TPE eartip including: a core portion formed in a hollow cylindrical structure corresponding to an outer circumferential surface of one end of the earphone and configured with a TPE material having a first hardness value; a wax guard portion formed in a plate-type structure integrally formed with an upper end of the core portion and having a plurality of through-holes formed therein and configured with the same material having the same hardness value as the core portion; and a flange portion formed in a structure continuously forming a curved structure sideward and downward in a radial shape after extending a predetermined height upward from the upper end of the core portion, configured with a TPE material having a second hardness value, and configured to come in contact with an inner surface of the external auditory meatus of the wearer.

In one embodiment of the present disclosure, the first hardness value of the core portion may be a value in a range of 150 to 300% of the second hardness value of the flange portion.

In one embodiment of the present disclosure, the core portion may include: a core main body portion having a hollow cylindrical structure mounted in a form surrounding a portion of the outer circumferential surface of the one end of the earphone and extending a predetermined height; an attachable/detachable portion having a structure integrally formed with a lower end of the core main body portion and attachable to and detachable from the outer circumferential surface of the one end of the earphone; an attachment/detachment guiding inclined portion having a structure continuously formed along an inner circumferential surface of a lower surface of the attachable/detachable portion and inclined toward the hollow structure inside the core main body portion; and a step forming portion having a structure formed at a portion where an inner upper surface of the attachable/detachable portion and an inner circumferential surface of the core main body portion come in contact with each other and protruding a predetermined height toward the hollow structure inside the core main body portion.

In one embodiment of the present disclosure, the dual structure TPE eartip may include: a foreign matter discharging air pump mounted in a ring structure along an outer circumferential surface of the core portion and configured to be elastically reduced due to being pressed from both sides by the flange portion to inject air suctioned from the outside into a transfer pipe; the transfer pipe formed inside the core portion and configured to transfer the air transferred from the foreign matter discharging air pump to a first nozzle and a second nozzle; the first nozzle formed as a plurality of first nozzles spaced apart at predetermined angles on an inner circumferential surface of an upper portion of the core portion and configured to communicate with the transfer pipe and spray the air transferred from the transfer pipe to a hollow space inside the core portion to allow the air to flow upward through the through-holes of the wax guard portion; and the second nozzle formed inside the wax guard portion, formed at each of the through-holes, and configured to communicate with the transfer pipe and spray the air transferred from the transfer pipe to the through-holes to allow the air to flow upward together with the air sprayed from the first nozzles.

In one embodiment of the present disclosure, the wax guard portion may include: a wax guard binding portion having a structure integrally coupled to the upper end of the core portion; a wax guard main body portion having a plate-type structure integrally formed with the wax guard binding portion and configured to cover the upper end of the core portion; and through-holes formed at predetermined intervals and in a predetermined pattern on the wax guard main body portion and configured to form holes having a regular polygonal structure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the accompanying drawings. Terms or words used in the present specification and claims should not be construed as being limited to their general or dictionary meanings and should be construed as having meanings and concepts that are in accordance with the technical spirit of the present disclosure.

Throughout the specification, when a certain member is described as being positioned "on" another member, this not only includes a case in which the certain member is in contact with the other member but also includes a case in which another member is present between the two members. Throughout the specification, when a certain portion is described as "including" a certain component, it means that the certain portion may further include another component instead of excluding other components unless clearly indicated otherwise.

Figure 1:
FIG. 1 is a cross-sectional view illustrating an eartip according to the related art.
Figure 2:
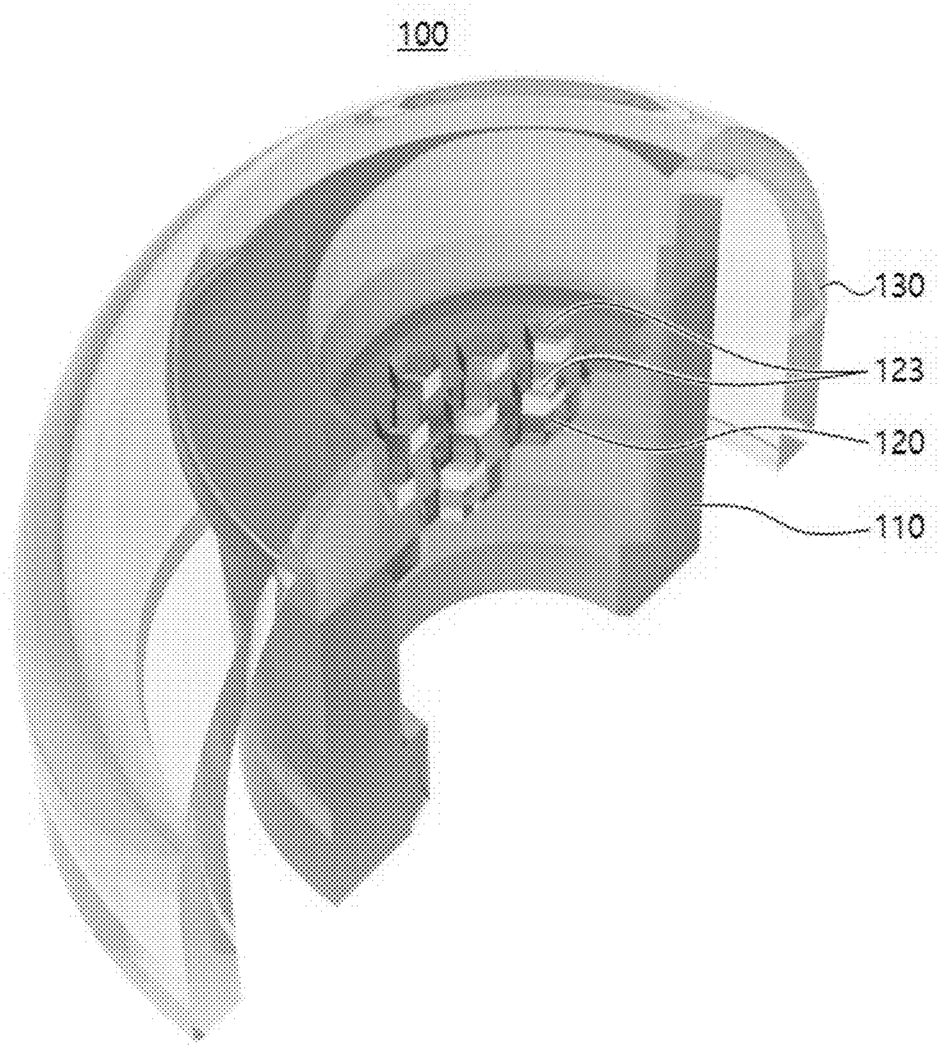
FIG. 2 is a picture showing a longitudinal cross-section of a dual structure thermoplastic elastomer (TPE) eartip according to one embodiment of the present disclosure.
Figure 3:
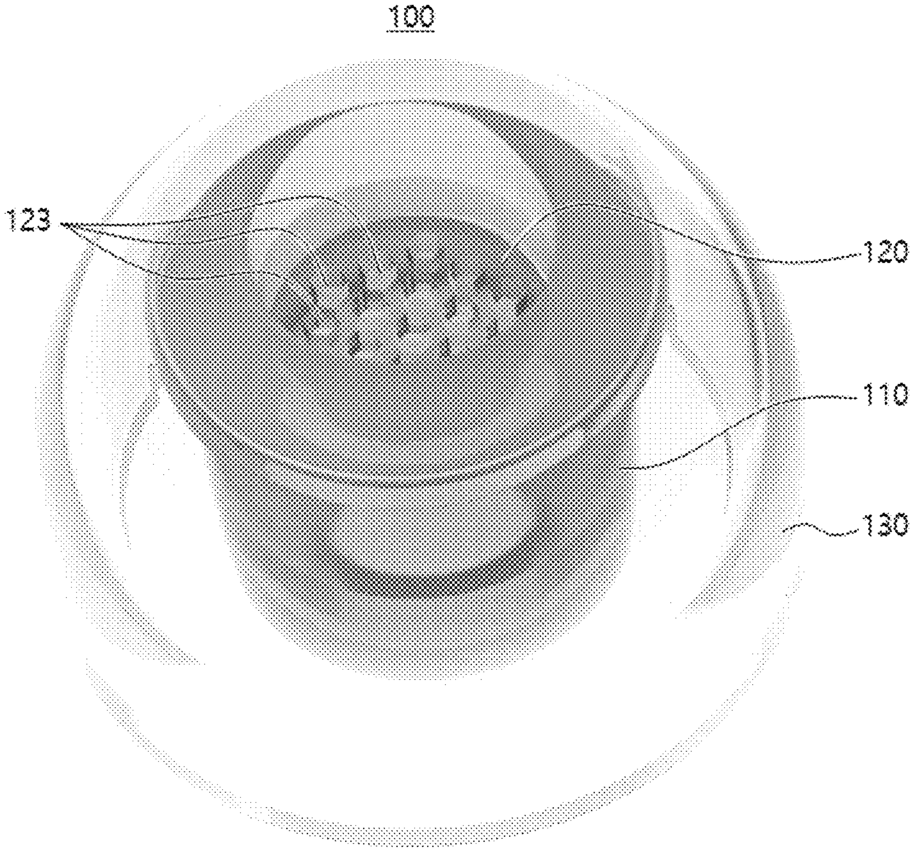
FIG. 3 is a picture showing the dual structure TPE eartip according to one embodiment of the present disclosure.
Figure 4:
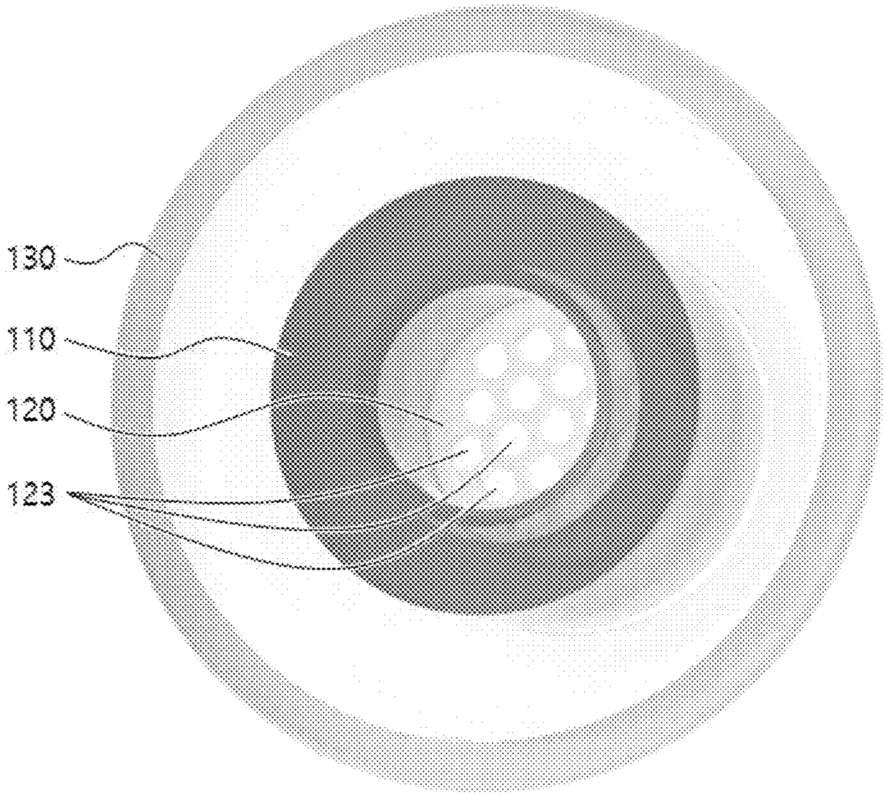
FIG. 4 is a picture showing a bottom of the dual structure TPE eartip illustrated in FIG. 3.

FIG. 2 illustrates a picture of a longitudinal cross-section of a dual structure thermoplastic elastomer (TPE) eartip according to one embodiment of the present disclosure, FIG. 3 illustrates a picture showing the dual structure TPE eartip according to one embodiment of the present disclosure, and FIG. 4 illustrates a picture showing a bottom of the dual structure TPE eartip illustrated in FIG. 3.

Referring to FIGS. 2 to 4, a dual structure TPE eartip 100 according to the present embodiment, which is an eartip mounted on one side of an earphone and inserted into an external auditory meatus of a wearer to stably fix the position of the earphone, includes a core portion 110, a wax guard portion 120, and a flange portion 130 which have specific structures. In this way, it is possible to provide an eartip including a structure that can change a partial pressure applied to a skin surface of an external auditory meatus of a wearer due to the eartip while the eartip is worn in the wearer's ear into a distributed pressure to address discomfort caused by the pressure and a foreign body sensation, can prevent foreign matter formed in the wearer's ear from entering the eartip to ensure hygiene, and can ensure a stable coupling state with an earphone.

Hereinafter, each configuration constituting the dual structure TPE eartip 100 according to the present embodiment will be described in detail.

Figure 5:
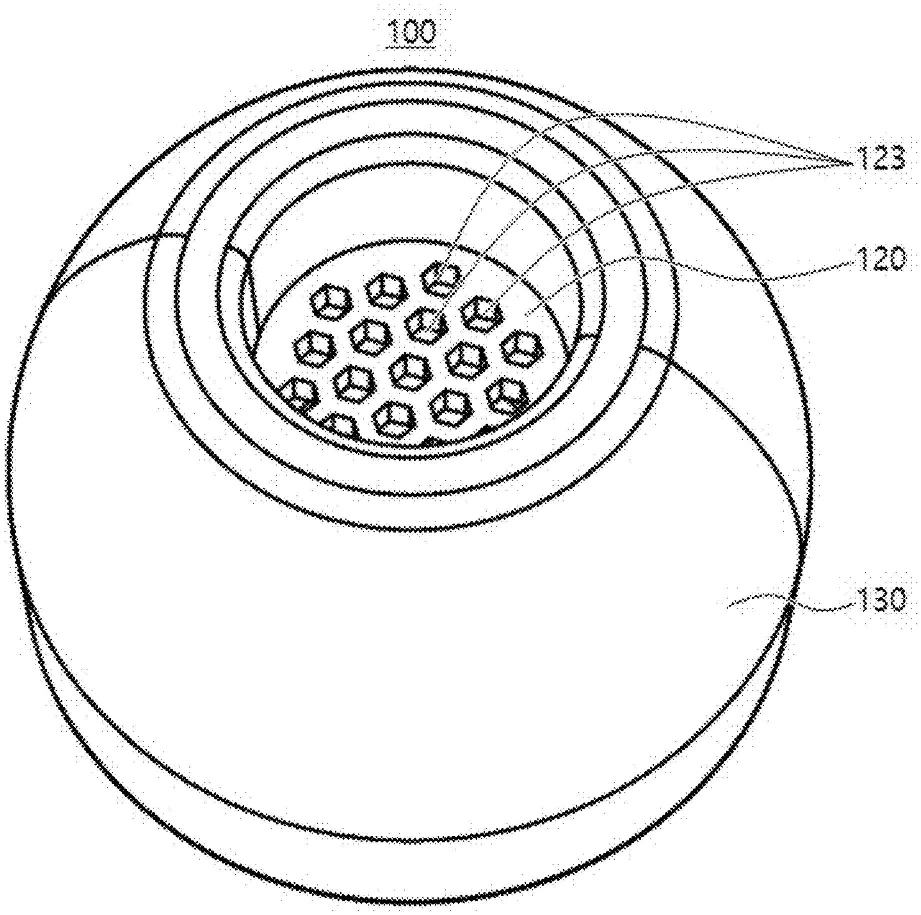
FIG. 5 is a perspective view showing the dual structure TPE eartip according to one embodiment of the present disclosure.
Figure 6:
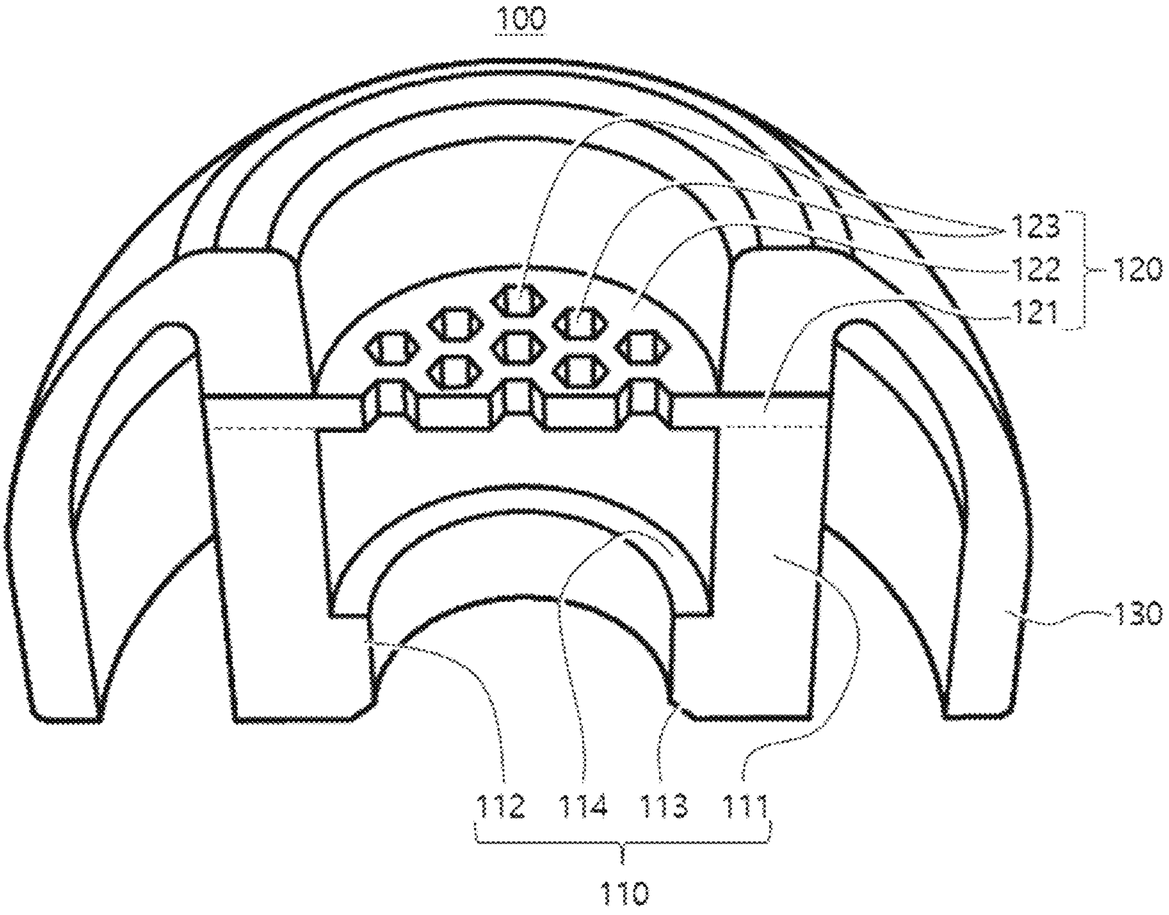
FIG. 6 is a longitudinal cross-sectional perspective view of the dual structure TPE eartip illustrated in FIG. 5.
Figure 7:
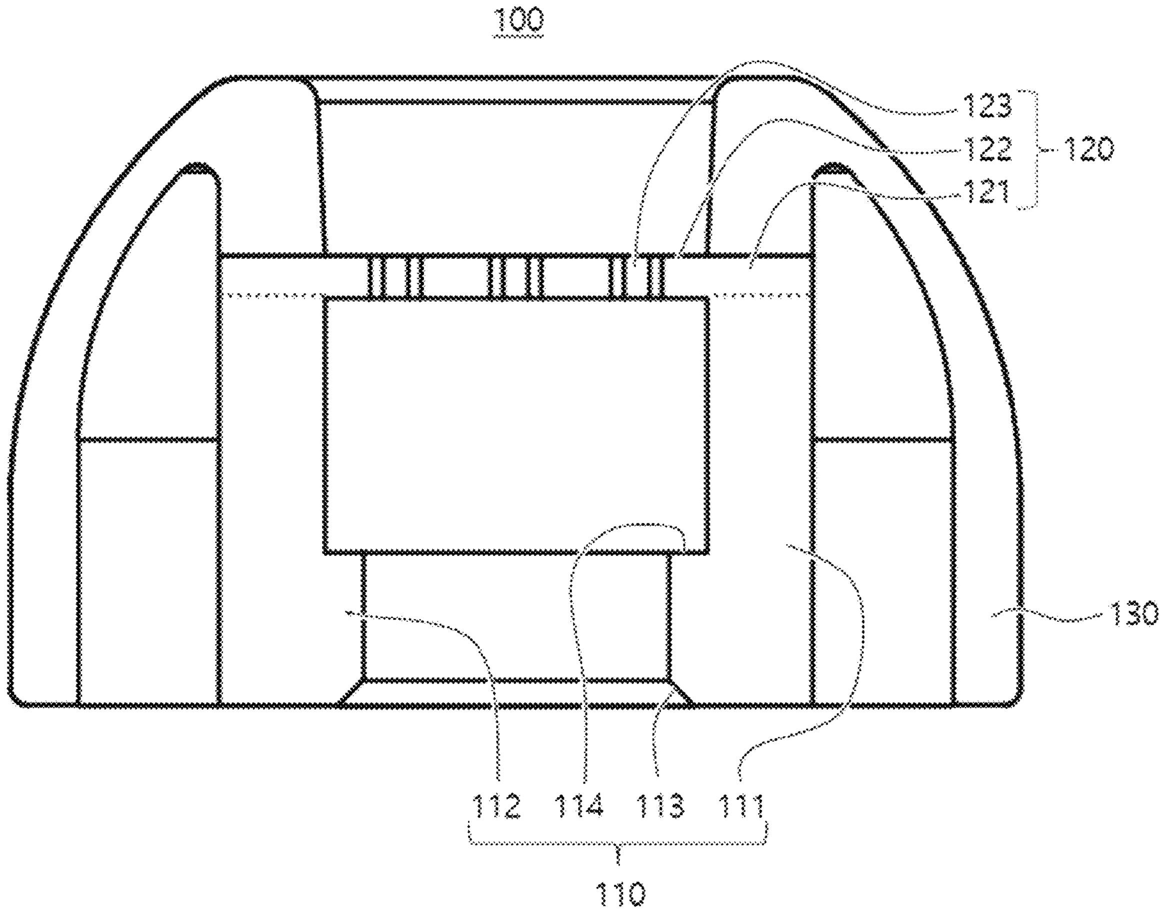
FIG. 7 is a longitudinal cross-sectional view of the dual structure TPE eartip illustrated in FIG. 5.
Figure 8:
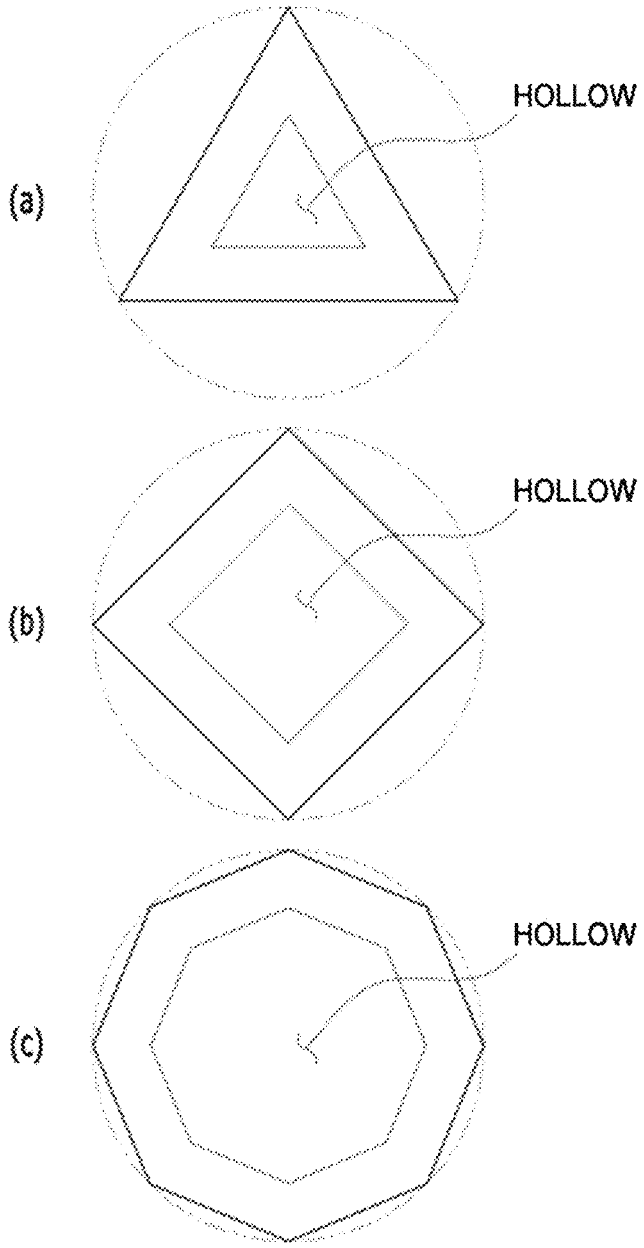
FIG. 8 is a plan view illustrating various shapes of a through-hole formed in a wax guard portion of the dual structure TPE eartip according to one embodiment of the present disclosure.
Figure 9:
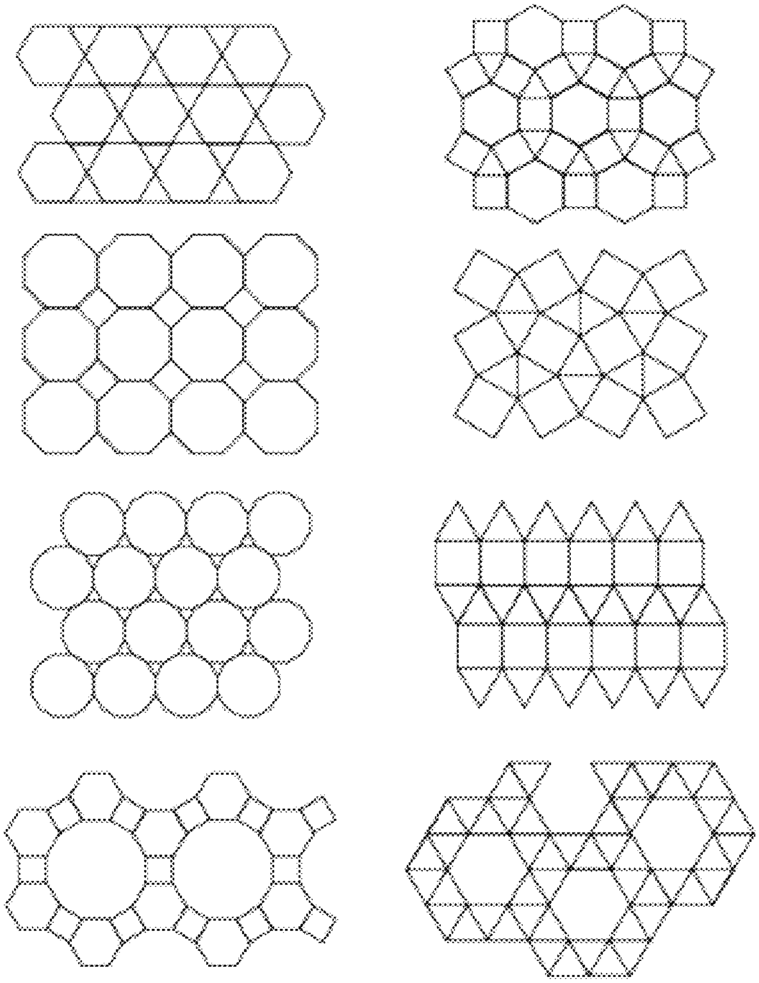
FIG. 9 is a plan view illustrating examples of forming a planar structure of the wax guard portion using various shapes illustrated in FIG. 8.

FIG. 5 illustrates a perspective view showing the dual structure TPE eartip according to one embodiment of the present disclosure, and FIG. 6 illustrates a longitudinal cross-sectional perspective view of the dual structure TPE eartip illustrated in FIG. 5. Also, FIG. 7 illustrates a longitudinal cross-sectional view of the dual structure TPE eartip illustrated in FIG. 5, FIG. 8 illustrates a plan view illustrating various shapes of a through-hole formed in the wax guard portion of the dual structure TPE eartip according to one embodiment of the present disclosure, and FIG. 9 illustrates a plan view illustrating examples of forming a planar structure of the wax guard portion using various shapes illustrated in FIG. 8.

Referring to FIGS. 5 to 9, the core portion 110 of the TPE eartip 100 according to the present embodiment is formed in a hollow cylindrical structure corresponding to an outer circumferential surface of one end of the earphone and is configured with a TPE material having a first hardness value.

Specifically, the core portion 110 may be a configuration including a core main body portion 111, an attachable/detachable portion 112, an attachment/detachment guiding inclined portion 113, and a step forming portion 114 which have specific structures. The core main body portion 111 has a hollow cylindrical structure mounted in a form surrounding a portion of the outer circumferential surface of the one end of the earphone and extending a predetermined height. The attachable/detachable portion 112 has a structure integrally formed with a lower end of the core main body portion 111 and attachable to and detachable from the outer circumferential surface of the one end of the earphone. The attachment/detachment guiding inclined portion 113 has a structure continuously formed along an inner circumferential surface of a lower surface of the attachable/detachable portion 112 and inclined toward the hollow structure inside the core main body portion 111. Also, the step forming portion 114 has a structure formed at a portion where an inner upper surface of the attachable/detachable portion 112 and an inner circumferential surface of the core main body portion 111 come in contact with each other and protruding a predetermined height toward the hollow structure inside the core main body portion 111.

The wax guard portion 120 according to the present embodiment is formed in a plate-type structure integrally formed with an upper end of the core portion 110 and having a plurality of through-holes 123 formed therein and configured with the same material having the same hardness value as the core portion 110.

Specifically, as illustrated in FIGS. 5 to 9, the wax guard portion 120 according to the present embodiment may be a configuration including a wax guard binding portion 121, a wax guard main body portion 122, and through-holes 123 which have specific structures. The wax guard binding portion 121 has a structure integrally coupled to the upper end of the core portion 110. The wax guard main body portion 122 has a plate-type structure integrally formed with the wax guard binding portion and configured to cover the upper end of the core portion 110. Also, the through-holes 123 are formed at predetermined intervals and in a predetermined pattern on the wax guard main body portion 122 and are configured to form holes having a regular polygonal structure. Here, the through-holes 123 may be formed in various regular polygonal structures as illustrated in FIG. 8, and in some cases, various planar structures may be formed as illustrated in FIG. 9 by combining various polygonal shapes, but of course, the present disclosure is not limited thereto.

The flange portion 130 according to the present embodiment is formed in a structure continuously forming a curved structure sideward and downward in a radial shape after extending a predetermined height upward from the upper end of the core portion 110, is configured with a TPE material having a second hardness value, and is configured to come in contact with an inner surface of the external auditory meatus of the wearer.

The above-mentioned first hardness value of the core portion 110 may be a value in a range of 150 to 300% of the second hardness value of the flange portion 130. Here, the first hardness value of the core portion 110 is not particularly limited as long as the first hardness value allows a binding state with the one end of the earphone to be stably maintained. Also, the second hardness value of the flange portion 130 may be set so that pressure is not applied to the skin inside the external auditory meatus of the wearer and may, of course, be set to various values according to the user's need and the designer's intention.

Figure 10:
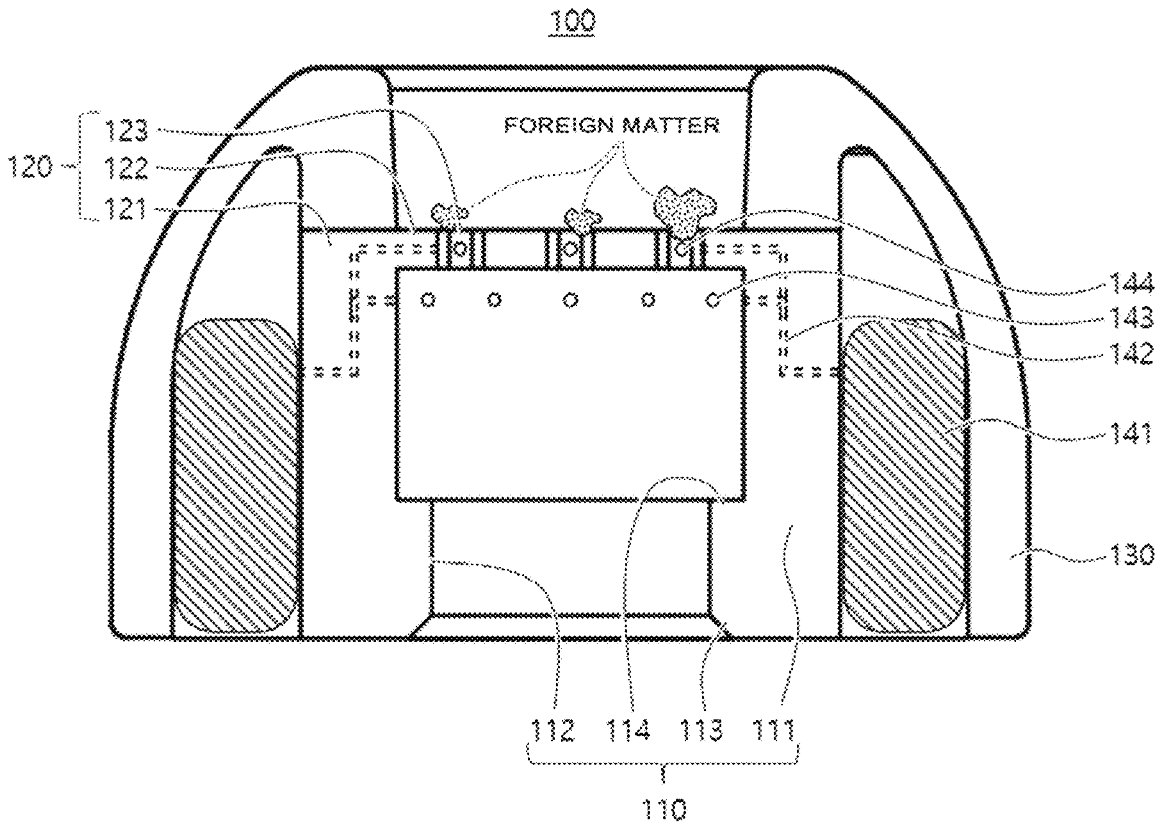
FIG. 10 is a longitudinal cross-sectional view of a dual structure TPE eartip according to another embodiment of the present disclosure.
Figure 11:
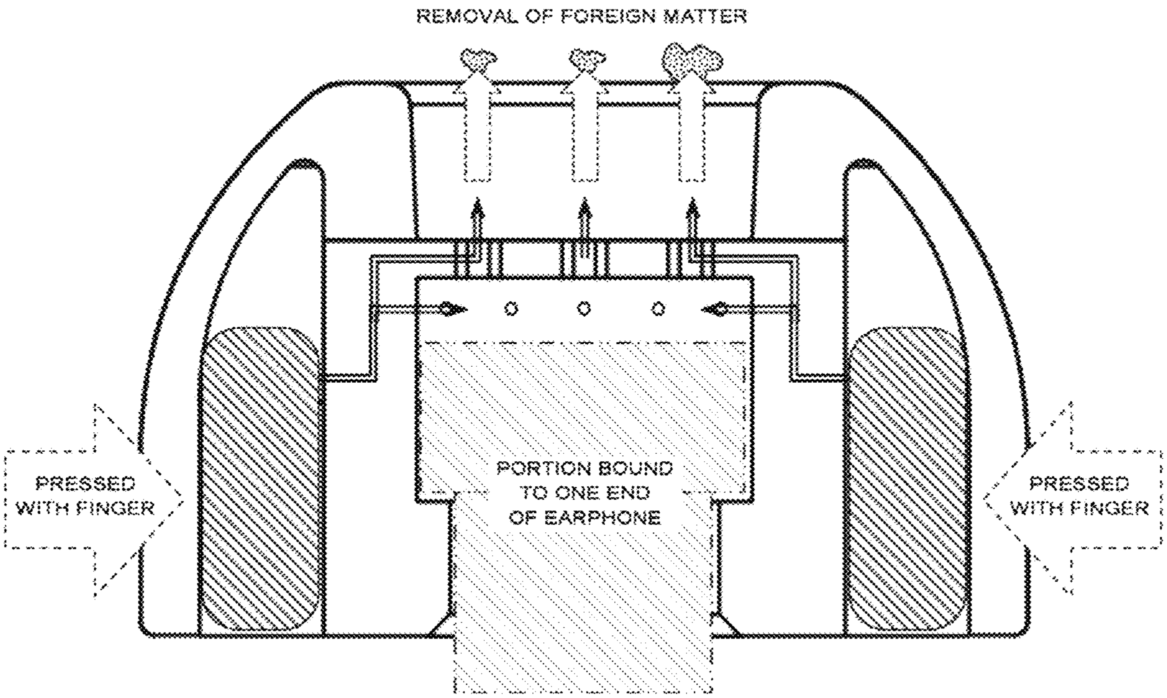
FIG. 11 is a longitudinal cross-sectional view illustrating a state in which the dual structure TPE eartip illustrated in FIG. 10 is operated to discharge foreign matter to the outside.

FIG. 10 illustrates a longitudinal cross-sectional view of a dual structure TPE eartip according to another embodiment of the present disclosure, and FIG. 11 is a longitudinal cross-sectional view illustrating a state in which the dual structure TPE eartip illustrated in FIG. 10 is operated to discharge foreign matter to the outside.

Referring to FIGS. 10 and 11, a dual structure TPE eartip 100 according to the present embodiment may be a configuration including a foreign matter discharging air pump 141, a transfer pipe 142, a first nozzle 143, and a second nozzle 144 which have specific structures.

Specifically, the foreign matter discharging air pump 141 is a configuration mounted in a ring structure along an outer circumferential surface of the core portion 110 and may be elastically reduced due to being pressed from both sides by the flange portion 130 to inject air suctioned from the outside into the transfer pipe 142. Here, the foreign matter discharging air pump 141 may be formed of a single cushion structure to complement the elasticity of the flange portion 130 when the eartip is inserted into the wearer's ear.

The transfer pipe 142 is a configuration formed inside the core portion 110 and may transfer the air transferred from the foreign matter discharging air pump 141 to the first nozzle 143 and the second nozzle 144.

The first nozzle 143 is a configuration formed as a plurality of first nozzles 143 spaced apart at predetermined angles on an inner circumferential surface of an upper portion of the core portion 110, and the plurality of first nozzles 143 are configured to communicate with the transfer pipe 142 and spray the air transferred from the transfer pipe 142 to a hollow space inside the core portion 110 to allow the air to flow upward through the through-holes 123 of the wax guard portion 120.

Also, the second nozzle 144 is a configuration formed inside the wax guard portion 120 and is formed at each of the through-holes 123 and configured to communicate with the transfer pipe 142 and spray the air transferred from the transfer pipe 142 to the through-holes 123 to allow the air to flow upward together with the air sprayed from the first nozzles 143.

As described above, according to the dual structure TPE eartip of the present disclosure, since the core portion 110, the wax guard portion 120, and the flange portion 130 having specific structures are provided, a partial pressure applied to a skin surface of the external auditory meatus of the wearer due to the eartip while the eartip is worn in the wearer's ear can be changed into a distributed pressure to address discomfort caused by the pressure and a foreign body sensation, foreign matter formed in the wearer's ear can be prevented from entering the eartip to ensure hygiene, and a stable coupling state with an earphone can be ensured.

Also, according to the dual structure TPE eartip of the present disclosure, since the foreign matter discharging air pump 141, the transfer pipe 142, the first nozzle 143, and the second nozzle 144 having specific structures are provided, the foreign matter discharging air pump can be operated by a user easily pressing the flange portion 130 using his or her fingers to discharge foreign matter accumulated or adsorbed at an upper surface of the wax guard portion 120 and inside the flange portion 130 to the outside. Thus, the eartip can be cleaned by the user lightly pressing the eartip with his or her fingers after using the earphone, and as a result, a clean state of the eartip can be ensured As described above, according to a dual structure TPE eartip of the present disclosure, since a core portion, a wax guard portion, and a flange portion having specific structures are provided, a partial pressure applied to a skin surface of an external auditory meatus of a wearer due to the eartip while the eartip is worn in the wearer's ear can be changed into a distributed pressure to address discomfort caused by the pressure and a foreign body sensation, foreign matter formed in the wearer's ear can be prevented from entering the eartip to ensure hygiene, and a stable coupling state with an earphone can be ensured.

Also, according to the dual structure TPE eartip of the present disclosure, since a foreign matter discharging air pump, a transfer pipe, a first nozzle, and a second nozzle having specific structures are provided, the foreign matter discharging air pump can be operated by a user easily pressing the flange portion using his or her fingers to discharge foreign matter accumulated or adsorbed at an upper surface of the wax guard portion and inside the flange portion to the outside. Thus, the eartip can be cleaned by the user lightly pressing the eartip with his or her fingers after using the earphone, and as a result, a clean state of the eartip can be ensured.

Only some specific embodiments of the present disclosure have been described in the detailed description above. However, it should be understood that the present disclosure is not limited to specific forms mentioned in the detailed description, and all modifications, equivalents, and substitutes within the spirit and scope of the present disclosure defined by the appended claims fall within the present disclosure.

That is, the present disclosure is not limited to the specific embodiments and description given above, and those of ordinary skill in the art to which the present disclosure pertains may make various modifications without departing from the gist of the present disclosure claimed in the claims. Such modifications belong to the protection scope of the present disclosure.

What is claimed is:

1. A dual structure thermoplastic elastomer (TPE) eartip, which is an eartip mounted on one side of an earphone and inserted into an external auditory meatus of a wearer to stably fix the position of the earphone, the dual structure TPE eartip comprising:

a core portion (110) formed in a hollow cylindrical structure corresponding to an outer circumferential surface of one end of the earphone and configured with a TPE material having a first hardness value;

a wax guard portion (120) formed in a plate-type structure integrally formed with an upper end of the core portion (110) and having a plurality of through-holes (123) formed therein and configured with the same material having the same hardness value as the core portion (110);

a flange portion (130) formed in a structure continuously forming a curved structure sideward and downward in a radial shape after extending a predetermined height upward from the upper end of the core portion (110), configured with a TPE material having a second hardness value, and configured to come in contact with an inner surface of the external auditory meatus of the wearer;

a foreign matter discharging air pump (141) provided in a space between the core portion (110) and the flange portion (130) and mounted in a ring structure along an outer circumferential surface of the core portion (110), and connected to and in communication with a transfer pipe (142) for air flow, and configured to be elastically reduced due to being pressed from both sides by the flange portion (130) to inject air suctioned from the outside into the transfer pipe (142);

the transfer pipe (142) formed inside the core portion (110) and configured to transfer the air transferred from the foreign matter discharging air pump (141) to a first nozzle (143) and a second nozzle (144);

the first nozzle (143) formed as a plurality of first nozzles (143) spaced apart at predetermined angles on an inner circumferential surface of an upper portion of the core portion (110) and configured to communicate with the transfer pipe (142) and spray the air transferred from the transfer pipe (142) to a hollow space inside the core portion (110) to allow the air to flow upward through the through-holes (123) of the wax guard portion (120); and the second nozzle (144) formed inside the wax guard portion (120), formed at each of the through-holes (123), and configured to communicate with the transfer pipe (142) and spray the air transferred from the transfer pipe (142) to the through-holes (123) to allow the air to flow upward together with the air sprayed from the first nozzles (143).

2. The dual structure TPE eartip of claim 1, wherein the first hardness value of the core portion (110) is a value in a range of 150 to 300% of the second hardness value of the flange portion (130).

3. The dual structure TPE eartip of claim 1, wherein the core portion (110) includes:

a core main body portion (111) having a hollow cylindrical structure mounted in a form surrounding a portion of the outer circumferential surface of the one end of the earphone and extending a predetermined height; and an attachable/detachable portion (112) having a structure integrally formed with a lower end of the core main body portion (111) and attachable to and detachable from the outer circumferential surface of the one end of the earphone.

4. The dual structure TPE eartip of claim 3, wherein the core portion (110) further includes:

an attachment/detachment guiding inclined portion (113) having a structure continuously formed along an inner circumferential surface of a lower surface of the attachable/detachable portion (112) and inclined toward the hollow structure inside the core main body portion (111); and a step forming portion (114) having a structure formed at a portion where an inner upper surface of the attachable/detachable portion (112) and an inner circumferential surface of the core main body portion (111) come in contact with each other and protruding a predetermined height toward the hollow structure inside the core main body portion (111).

5. The dual structure TPE eartip of claim 1, wherein the wax guard portion (120) includes:

a wax guard binding portion (121) having a structure integrally coupled to the upper end of the core portion (110);

a wax guard main body portion (122) having a plate-type structure integrally formed with the wax guard binding portion and configured to cover the upper end of the core portion (110); and the through-holes (123) formed at predetermined intervals and in a predetermined pattern on the wax guard main body portion (122) and configured to form holes having a regular polygonal structure.

* * * * *